United States Patent [19]

Bruening et al.

[11] Patent Number: 5,120,443
[45] Date of Patent: Jun. 9, 1992

[54] PROCESSES FOR REMOVING, SEPARATING AND CONCENTRATING RHODIUM, IRIDIUM, AND RUTHENIUM FROM SOLUTIONS USING MACROCYCLIC AND NONMACROCYCLIC POLYALKYLENE-POLYAMINE-CONTAINING LIGANDS BONDED TO INORGANIC SUPPORTS

[75] Inventors: Ronald L. Bruening, Orem; Bryon J. Tarbet, Highland; Reed M. Izatt; Jerald S. Bradshaw, both of Provo, all of Utah

[73] Assignee: Brigham Young University, Provo, Utah

[21] Appl. No.: 709,378

[22] Filed: Jun. 3, 1991

[51] Int. Cl.$^5$ .............................................. B01D 15/00
[52] U.S. Cl. .................................... 210/638; 210/679; 210/688
[58] Field of Search ............... 210/634, 638, 688, 679, 210/681; 526/263; 428/284, 288

[56] References Cited

U.S. PATENT DOCUMENTS 4,952,321 8/1990 Bradshaw et al. ............... 210/688 X Primary Examiner—Frank Spear
Attorney, Agent, or Firm—Thorpe North & Western

[57] ABSTRACT

A method for the removal, separation, and concentration of Rh, Ir, and/or Ru from a source solution which may contain larger concentrations of other ions including $H^+$ comprises bringing the source solution into contact with a compound comprising a polyalkylene-polyamine-containing ligand covalently bonded through an organic spacer silicon grouping to a solid inorganic support. The ligand portion(s) of the compound has affinity for complexed anionic species of Rh, Ir, and/or Ru thereby removing them from the source solution. The Rh and/or Ru are first selectively removed from the compound through contact with a much smaller volume of a first receiving solution which changes the Rh and/or Ru speciation to have no affinity for the ligand portion of the compound. The Ir is then removed from the compound through contact with a much smaller volume of a second receiving solution having a greater affinity for the Ir than the ligand portion of the compound or having a greater affinity for the ligand portion of the compound than the Ir species. The concentrated ions thus removed may be further separated and recovered by known methods. The process is useful in the recovery and refining of the valuable Rh and Ir from a variety of sources. The invention is also drawn to the particular highly stable branched polyalkylene-polyamine-containing ligands covalently bonded through a spacer grouping to a hydrophilic inorganic solid support material.

21 Claims, No Drawings

PROCESSES FOR REMOVING, SEPARATING AND CONCENTRATING RHODIUM, IRIDIUM, AND RUTHENIUM FROM SOLUTIONS USING MACROCYCLIC AND NONMACROCYCLIC POLYALKYLENE-POLYAMINE-CONTAINING LIGANDS BONDED TO INORGANIC SUPPORTS

FIELD OF THE INVENTION

This invention relates to a process for removing, concentrating, and separating Rh, Ir, and Ru from solutions wherein these elements are present as complex anions which may be admixed with other ions which may be present in much higher concentrations by the use of highly stable macrocyclic and nonmacrocyclic as well as branched or unbranched polyalkylene-polyamine-containing ligands covalently bonded to inorganic solid supports and to certain of such polyalkylene-polyamine-solid supported materials which are novel compounds. More particularly, this invention relates to a process for removing such Rh, Ir, and Ru anions from an admixture with other ions in solution by forming a complex of the Rh, Ir, and Ru anions with compounds composed of a highly stable macrocyclic or nonmacrocyclic, branched or unbranched polyalkylene-polyamine ligand covalently bonded to an inorganic matrix by flowing such solutions through a column, or similar means, packed with such highly stable polyalkylene-polyamine-solid supported material and then selectively breaking the complex of the Rh and Ru anions from the compounds to which such anions have become attached by flowing a first receiving solution through the column followed by breaking the complex of the Ir anion from the same compounds by flowing a second receiving solution through the column. Both the first and second receiving solutions are used in smaller volume to remove, separate, and concentrate the desired ions in solution in the respective receiving liquids than the original volume of solution passed through the column. The Rh, Ir, and Ru thus removed may then be recovered by known methods. The first receiving solution is a liquid in which the Rh and/or Ru containing anion complex is rapidly broken apart into a complexed ion which has minimal affinity for the solid supported materials without changing the speciation of the Ir complex.

BACKGROUND OF THE INVENTION

Effective methods for the recovery and separation of Rh, Ru, and Ir from solutions in which they are present as complex anions and which also contain typically higher concentrations of other ions represents a real need in modern technology. The current processes used are lengthy and require many processing steps. Moreover, the recoveries are generally not satisfactory. The separation of Rh and Ir from each other in these solutions also represents a real need in modern technology. As a specific example, efficient, rapid, and economical separation of Rh and Ir from each other and from concentrated HCl solutions which also contain highly concentrated base metals, Pt and Pd represents a real separation need with presently available technologies for its accomplishment being unsatisfactory. The Rh and Ir are often present at low concentrations in these solutions. Hence, it would be highly beneficial to develop a process which could selectively concentrate and recover these anions.

It is known that protonated polyamines, e.g., the ethylene diammonium cations, are capable of forming complexes with a variety of anions in single solvent, solvent extraction, and liquid membrane situations. For example, solvent extraction of precious metal chloro anions is reviewed in an article by R.A. Grant, "The Separation Chemistry of Rhodium and Iridium", in *Precious Metals Recovery and Refining, Proceedings of the Precious Metals Recovery and Refining Seminar of the International Precious Metals Institute at Scottsdale, Ariz.,* Ed. by L. Manziek et al., Historical Publications, (1990), page 139.

Hancock et al., British Patent No. 1,530,039 issued in July 1976, "Removal of Metals from Solution"; Hancock et al., European Patent Application No. 0018102 published March 1980. "Functionalized Inorganic Oxide Products and Their Use in the 19 Removal of Heavy Metals, Transition Metals and Actinide Metals from Solution"; and Plueddeman, Canadian Patent No. 1,196,618, November 1985 "Metal Extraction from Solution and Immobilized Chelating Agents Used Therefore", describe the preparation and use of nonmacrocyclic polyalkylene-polyamine materials of both branched and unbranched form bonded to inorganic supports via strictly hydrocarbon linkages to perform ion separations. However, such materials are somewhat unstable. It is known that amine functional groups attached to silica gel, where the amine function is three carbon atoms removed from the silica gel, are not completely stable. E. P. Plueddemann, "Silane Compounds for Silylating Surfaces" *Silane Surfaces and Interfaces Symposium,* Ed. D. E. Leyden, Snowmass (1985), report that amine groups three atoms removed from silicon slowly lose their ability to complex copper (II). D. M. Wonnacott et al., "Hydrolytic Stability of Aminopropyl Stationary Phases Used in the Size-Exclusion Chromatography of Cationic Polymers", *J. Chromatog.,* v. 389, pp. 103–113 (1987) and T. G. Waddell et al., "The Nature of Organosilane to Silica-Surface Bonding", *JACS,* v. 103, pp. 5303–5307 (1981) discuss the stability of the aminopropyl-silica gel types of materials. In the conclusion, Wonnacott et al. state that "aminoalkyl silanes which have been used extensively in the synthesis of silica-based, weak ion exchangers do not lend themselves to this type of chromatography due to their hydrolytic instability."

The preparation and use of unbranched, but highly stable macrocyclic and nonmacrocyclic polyalkylene-polyamine compounds covalently bonded to inorganic solid support to separate a wide variety of ions are described in Bradshaw et al., U.S. Pat. No. 4,952,321 issued Aug. 28, 1990, "Process of Removing and Concentrating Desired Ions from Solutions"., Bradshaw et al., U.S. Pat. No. 4,943,375 issued Jul. 24, 1990, "The Process of Separating a Selected Ion From a Plurality of Other Ions in a Multiple Ion Solution by Contacting the Solution with a Macrocyclic Ligand Bonded to Silica which Selectively Complexes with the Desired Ion"; and in Bruening et al., pending application Ser. No. 07/593,305 filed Oct. 10, 1990, "Poiytetraalkylammonium and Polytriakylamine-Containing Ligands Bonded to Inorganic Supports and Processes of Using the Same for Removing and Concentrating Desired Ions from Solutions".

The potential Rh, Ir, and Ru speciation in solutions containing various complexing agents, the reduced kinetics of ligand exchange for Ir compared to Rh and Ru anionic complexes and the ability to particularly enhance the kinetics of Rh and Ru ligand exchange using elevated temperature and/or reducing agents have been alluded to in books and articles such as the aforementioned review by R. A. Grant and "Advanced Inorganic Chemistry: A Comprehensive Text", Fourth Edition, ed. by F.A. Cotton and G. Wilkinson, John Wiley and Sons, 1980, p. 912-948.

In none of the above has it been suggested or shown that highly stable polyalkylene-polyamine compounds covalently bonded to inorganic solid supports, such as silica gel, can be prepared and used to highly selectively bind Rh, Ir, and/or Ru and that these compounds allow for the Ir to be removed from the solid supported compounds after the Rh and/or Ru have been selectively eluted.

Furthermore, the preparation of highly stable branched polyalkylene-polyamine compounds covalently bonded to inorganic solid supports has also not been described.

SUMMARY OF THE INVENTION

The present invention is drawn to the use of highly stable solid supported polyamines which allow for selective removal of anionic complexes containing Rh, Ir, and/or Ru from complex solutions followed by separate elution of the Rh and/or Ru before eluting the Ir. This provides a rapid, efficient, and economical way of separating Rh, Ir and/or Ru from other elements and from each other to be achieved. Some of the solid supported polyamines have been previously utilized for removal of other ions as referenced above but the present invention is also directed to a class of highly stable branched polyamines which have previously been unknown and which are selective to the removal of Rh, Ir and/or Ru.

The solid supported polyamine compounds suitable for use in the present invention comprise suitable polyalkylene-polyamine-containing ligands which are covalently bonded through an appropriate spacer grouping of high stability to a silicon atom and further covalently bonded to a solid support and are represented by the Formulas 1-5. Formulas 1 and 2 are macrocycles; Formula 3 is a straight chain amine; Formula 4 is a branched chain amine and Formula 5 is a tertiary or quaternary amine. Each of Formulas 1-5 has a common solid support grouping, and even spacer grouping and differ primarily in the ligand used. Formulas 1-5 may be generically represented by Formula I:

where X is a spacer grouping having from 4 to 20 carbon atoms which is of a functional nature that it is sufficiently hydrophilic to function in an aqueous environment and will separate the ligand from the solid matrix support surface to maximize the interaction between the ligand and desired Rh, Ir and/or Ru ion being separated and is preferably a member selected from the group consisting of aryl, glycidyl, glycidoxyalkyl, alkoxyalkyl and carboxyalkyl and combinations thereof. Ligand is a member selected from the group consisting of highly stable macrocyclic, nonmacrocyclic, branched or unbranched polyalkylenepolyamine-containing hydrocarbons which are covalently bonded to inorganic solid supports portions through the spacer grouping. The specific ligands are defined in association with each of Formulas 1 through 5. Matrix and Z remains constant for each formula. Matrix is a solid support material selected from the group consisting of sand, silica gel, glass, glass fibers, alumina, nickel oxide, zirconia, or titania, or other hydrophilic inorganic supports and mixtures thereof. The Z moieties can be the same or different and are members selected from the group consisting of Cl, Br, I, alkyl, alkoxy, substituted alkyl or substituted alkoxy and 0-matrix. When Z moieties are other than O-matrix they are functionally classified as leaving groups, i.e. groups attached to the silicon atom which, when reacted with an O-solid hydrophilic matrix material, may leave or be replaced by the O-matrix. If any such functional leaving groups are left over after reacting a silicon containing spacer group or spacer/ligand group with the solid hydrophilic matrix support material, these groups will have no direct function in the interaction between the desired ion and the polyamine ligand-attached to the solid support. Alkyl or alkoxy means a 1-6 carbon member alkyl or alkoxy group which may be substituted or unsubstituted, straight or branched chain. By substituted is meant by groups such as Cl, Br, I, $NO_2$ and the like.

Representative of $(Z)_3$-Si-X compounds suitable for reaction with the "matrix" and "ligand" groups to form the compounds of Formula I, particularly as utilized in Formulas 3, 4 and 5, are those selected from the group consisting of dimethyl(triethoxysilylpropyl)malonate; N-[(3-trimethoxysilyl)propyl]ethylenediaminetriacetic acid., p-(chloromethyl)phenyltrimethoxysilane vinyltriethoxysilane; 3-glycidoxypropyltrimethoxysilane; and combinations thereof. Those compounds containing 3-glycidoxypropyl as an X or spacer grouping are particularly preferred.

Formulas 1 and 2 are more specifically elaborated upon in Bradshaw et al., U.S. Pat. No. 4,943,375 which issued Jul. 24, 1990 and are as follows:

Formula 1 (Macrocyclic amines):

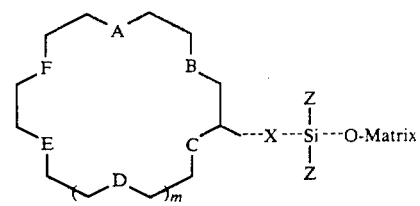

where A, B, C, D, E and F may be any combination of O, $OCH_2$, N-R or $N(R)CH_2$, where R is a member selected from the group consisting of H, alkyl of 1 to 10 carbons or benzyl; m is an integer between —1 and 4 with 0 to being 4 preferred; Z and —O— Matrix are as defined above, X is as defined above but is preferably glycidoxypropyl or $CH_2O(CH_2)_4$ and a is an integer of between 1 and 16 with the proviso that at least two amine nitrogens must be present in A, B, C, D. E and F.

Formula 2 (Macrocyclic amines):

-continued

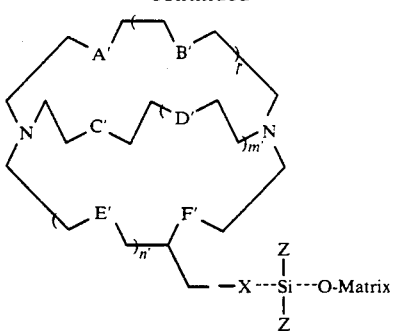

where A', B', C', D', E' and F' may be any combination of O, OCH$_2$, N—R or N(R)CH$_2$, where R is selected from the group consisting of H, alkyl of 1 to 10 carbons or benzyl; l', m' and n' can each be an integer between 0 and 2; Z and -O-Matrix are as defined above, X is as defined above but is preferably glycidoxypropyl or CH$_2$O(CH$_2$)$_y$ and y is an integer of 1 to 16.

Formula 3 (Straight Chain Amines):

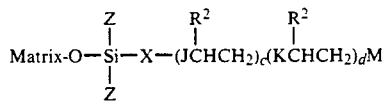

where J and K are each a radical selected from the group of N(R$^3$), N(R$^3$)CH$_2$, O and OCH$_2$, with the proviso that either J or K must be N(R$^3$) or N(R$^3$)CH$_2$; R$^2$ is a radical selected from the group consisting of H or lower alkyl; R$^3$ is a radical selected from the group consisting of H, lower alkyl and aryl such as phenyl, naphthyl and pyridyl; c is an integer of from 1 to about 25; d is an integer of from 0 to about 25; M is a radical selected from the group consisting of H, NH(R$^3$), OH and lower alkyl; Z and O—Matrix are as defined above; X is as defined for Formula I and is preferably

wherein R$^1$ is a radical selected from the group consisting of H, OH, lower alkyl and aryl such as phenyl, naphthyl and pyridyl, with OH being preferred; a is an integer of from 2 to about 10 and b is 1.

Formula 4 (Branched Amines):

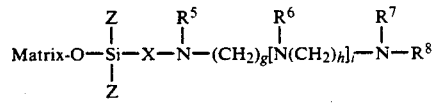

wherein R$^5$ and R$^6$ are (CH$_2$)$_j$NR$^7$R$^8$ or H; R$^7$ and R$^8$ are (CH$_2$)$_k$NH$_2$ or H; g, h, j and k are each an integer of from 2 to 10; i is an integer of from 0 to 10; Z and O-Matrix are as defined for Formula I; X is as defined for Formula I and is preferably

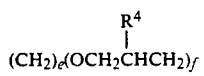

wherein R$^4$ is a radical selected from the group consisting of H, OH, lower alkyl and aryl such as phenyl, naphthyl and pyridyl, with OH being preferred; e is an integer of from 1 to 10; f is an integer of 1.

Formula 5 (Quaternary Amines):

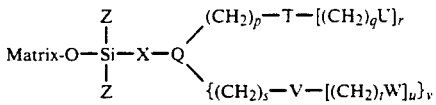

wherein Z, O-Matrix and X are as defined for Formula I; Q is a member selected from the group consisting of N, NR$_x''$ and O. T, U, V and W are members selected from the group consisting of NR$_x''$, and O, or OH if O is located in a terminal position, with x being a positive integer such that the amine nitrogens present are tertiary or quaternary with the further proviso that the formula contains at least two tertiary or quaternary nitrogens from among Q, T, U, V, and W. The letters p, q, s, and t represent integers ranging from 2 to 10; r and u are each integers ranging from 0 to 25, with ranges from 0 to 7 being preferred and 1-7 being most preferred; and v is an integer of 0 or 1 with the proviso that v must be 0 when Q is NR$_x''$ or O. R'' is selected from the group consisting of lower alkyl and substituted lower alkyl. By substituted alkyl is meant alkyl groups containing substituents such as halogen, alkyl amino, branched alkyl amino, and the like which do not interfere with the ability of the compound to function according to the invention.

Unless otherwise stated, the terms alkylamino and branched alkylamino are inclusive of primary, secondary and tertiary alkyl amino groups such that the amino nitrogen can be tertiary or quaternary if desired.

The polyalkylene-polyamine ligands covalently bonded to solid supports or matrices as shown in Formulas 1-5 are characterized by selectivity for and removal of Rh, Ir, and/or Ru present as certain anionic complexes in source solutions. Such source solutions are usually acidic matrices. The Rh, Ir and Ru anion complexes to be removed are generally present at low concentrations and are in admixture with other ions and complexing or chelating agents one does not desire to remove but which are present in much greater concentrations in the solution. The separation is effected in a separation device such as a column through which the solution is flowed.

Each of the ligands shown in Formulas 1-5 has certain advantages when used in the present invention. For example, the compounds of Formulas 1-4 are characterized by higher selectivity for anionic complexes of Rh, Ir, and/or Ru over anionic complexes involving Pt and Pd relative to the compounds of Formula 5. However, the compounds of Formulas 4 and 5 are characterized by their ease of selective Rh elution under somewhat less expensive conditions relative to the compounds of Formulas 1-3 as more fully illustrated in the examples which follow. The process of selectively removing and concentrating anionic complexes of Rh, Ir, and/or Ru is characterized by the ability to quantitatively complex, from a larger volume of solution, the desired ion(s) when they are present at low concentrations. The Rh and/or Ru and the Ir anionic complexes are recovered from the separation column by flowing through it a small volume of a first receiving phase which contains reagents which quantitatively remove the Rh and/or Ru, but not the Ir, from the column followed by a second receiving phase which contains a solubilized reagent, which need not be selective but which will strip the Ir from the ligand quantitatively. The recovery of the separated Rh and/or Ru and the Ir anion complexes as well as the separation of Rh from Ru from the receiving phase can then be accomplished by known procedures.

DETAILED DESCRIPTION OF THE INVENTION

As summarized above, the present invention is drawn to the use of various highly stable polyalkylene-polyamine-containing hydrocarbon ligands covalently bound through a spacer to a silicon moiety and further attached to a solid matrix or support, (as represented by Formula I and more specifically illustrated by Formulas 1-5), to remove, concentrate, and separate Rh, Ir, and/or Ru, present as certain anionic complexes, from other ions and each other. Such solutions from which Rh, Ir, and/or Ru are to be concentrated, separated, and/or recovered are referred to herein as "source solutions." In many instances the concentration of Rh, Ir, and/or Ru in the source solutions will be much less than the concentration of other ions from which they are to be separated.

The concentration of Rh, Ir, and/or Ru is accomplished by forming a ligand complex of an anionic complex of the Rh, Ir, and/or Ru, such as $RhCl_6^{3-}$, $IrCl_6^{3-}$, $RuCl_6^{3-}$, $RhBr_6^{3-}$, with a compound represented by Formula I by flowing a source solution containing the Rh, Ir, and/or Ru anionic complexes through a column packed with the compound to attract and bind the desired ions to the protonated ligand portion of the compound. The Rh and/or Ru are selectively removed from the compound by breaking the ligand compound-Rh and/or Ru anion complex by flowing a first receiving solution through the column. A second receiving solution is then flowed through the column to break the ligand compound-Ir anion complex. The receiving solutions are used in much smaller volume than the volume of the initial source solution so that the Rh and/or Ru anions and Ir anion recovered in the respective receiving liquids are in concentrated form relative to the source solution. The receiving liquids or recovery solutions either (1) change the state of the Rh, Ir and/or Ru anionic complexes so they do not have affinity for the polyalkylene-polyamine ligand or (2) form a stronger complex with the polyalkylene-polyamine ligand than do the anionic Rh, Ir, and/or Ru complex and thus the desired ion(s) is quantitatively stripped from the polyalkylene-polyamine ligand in concentrated form in the receiving solution. Once in the receiving liquid, the recovery of the Rh, Ir, and/or Ru and the separation of Rh from Ru can be accomplished using known procedures. The polyalkylene-polyamine-containing ligands of Formulas 1, 2, 3, and 5 are not novel compounds and may be prepared by various methods described and illustrated in examples as set forth in the aforementioned Bradshaw et al. patents, and the pending Bruening et al. application with some specific examples being given below.

The branched chained polyalkylene-polyamine-containing ligands of Formula 4 are novel compounds and may be prepared by various methods which are illustrated in examples which follow.

EXAMPLE 1

In this example, a straight chain amine-containing hydrocarbon bonded to silica gel was made in accordance with Formula 3 wherein a is 3, b is 1, c is 5, d is 0, $R^1$ is hydroxy, $R^2$ is hydrogen, J is NH, K is not present since d is 0, M is $NHCH_2CH(OH)CH_2O(CH_2)_3Si(O\text{-silica gel})_3$, Matrix is silica gel and each Z is O-silica gel or methoxy.

Silica gel (60-200 mesh)(1.6 kilograms) was suspended in 7 liters of toluene which contained 304 grams of 3-glycidoxypropyltrimethoxysilane. The gel was stirred slowly (to insure that the gel was not physically damaged) and the mixture was heated at 100° C. for 8 to 18 hours. Then, 175-225 grams of pentaethylenehexaamine was slowly added and the slowly stirred solution was heated at 100° C. for 5-10 hours. The solvent was filtered and the solid amine-bound silica gel was air-dried in a well ventilated hood.

EXAMPLE 2

In this example a branched-chain polyamine attached to silica gel was prepared which corresponds to Formula 4, The procedure followed was as in Example 1 except that the amine 1,4,7,11,-tetraaza-4,7-di(2-aminoethyl)-decane was prepared according to a procedure given in U.S. Pat. No. 3,201,472 (1965), whereby ethylenediamine is reacted with acrylamide in a 4:1 molar ratio and the resulting tetraamide is then treated with sodium hypochlorite and sodium hydroxide to afford the desired amine. This amine was extracted with dichloromethane/ether, dried with magnesium sulfate, the solvents were removed and the amine was distilled under high vacuum (b.p. 160° C./0.2 mm Hg) to yield 48% of an oil. A product according to Formula 4 was recovered wherein e is 3, f is 1, g is 2, h is 2, i is 2, $R^4$ is hydroxy, $R^5$ is H, $R^6$ is $(CH_2)_jNR^7R^8$ both first and second occurrence with j being 2, $R^7$ and $R^8$ are H in the first occurrence and are $(CH)_kNH_2$ in the second and third occurrence, with k being 2. This product has the formula:

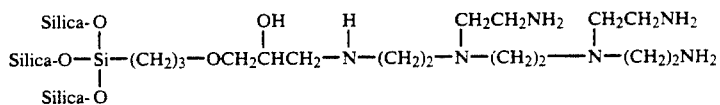

EXAMPLE 3

In this example, a different branched-chain polyamine was prepared with tris(2-aminoethyl)amine used in place of the branched-chain polyamine of Example 2. A product according to Formula 4 was recovered wherein e is 3, f is 1, g is 2, i is 0, $R^4$ is hydroxy, $R^5$ is H, $R^7$ and $R^8$ are $(CH)_kNH_2$, with k being 2. This product has the formula:

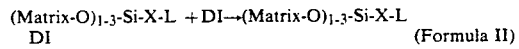

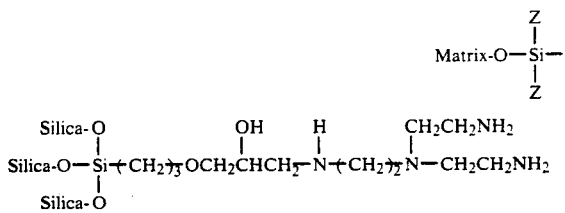

EXAMPLE 4

In this example, allyloxymethyl hexaaza-18-crown-6 was prepared by reaction of the hydroxy methyl derivative with allylbromide. The hydroxy methyl crown may be prepared according to procedures outlined in "Facile Synthesis of Hydroxy Methyl Crown Ethers" by I. Ikeda, H. E. Mura, and M. Okahara, *Synthesis* pages 73 and 74 (1984) which is incorporated herein by reference. The allyloxy methyl crown is then reacted with triethoxysilane in the presence of a Pt catalyst. The hydrosilylated product is then bonded to silica gel in an inert solvent such as toluene. The silica gel bound macrocycle is then washed and dried before use. Cyclams according to Formula 1 may be prepared where m is 1, A, B, C, D, E, and F are NH, X is $CH_2O(CH_2)_3$, and Z is a member selected from the group consisting of alkyl, Cl, alkoxy or O— silica. Hexaaza-18-crown-6 (commercially available) may be attached as in Example 1, substituting the aza crown for pentaethylene-hexaamine.

EXAMPLE 5

A polytetraalkylammonium-containing ligand as represented by Formula 5 was prepared by mixing pentaethylenehexamine (4.64 g, 0.02 mol) with 3-glycidoxypropyltrimethoxy-silane (4.72 g, 0.02 mol) in toluene and allowing the mixture to stir overnight. Silica gel (50 g, 35–60 mesh) was added and the mixture was stirred with a mechanical stirrer (to avoid crushing the gel) and heated at 50°–70° C. overnight to covalently bond the ligand to the silica gel. (Matrix will be silica gel and one or two of the Z groups will be O-silica gel after this procedure.) The silica gel was dried and then transferred to a new flask fitted with a mechanical stirrer with methanol as the solvent and sodium carbonate as the base. Methyl iodide (0.26 mol) was added slowly to the stirring mixture and heated at 40° C. for 4 hours. Water (100 mL) was then added and the reaction proceeded overnight. The gel was filtered, washed with water and dried, resulting in a ligand of the formula:

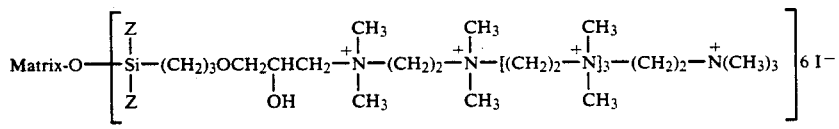

which corresponds to Formula 5 wherein Z can be either O-Matrix or methoxy or O-Matrix; X is glycidoxypropyl; Q is $NR_x''$ with x being 2 and R being Methyl; p is 2, v is 0 and r is 4; T and U are each $NR_x''$ with x such that all the nitrogens are quaternary.

EXAMPLE 6

In this Example the conditions given in Example 4 were used except that the amount of methyl iodide used was reduced such that the ligand bonded to silica gel had the following formula:

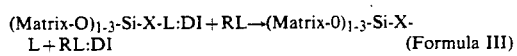

which corresponds to Formula 5 wherein each Z is methoxy or O-Matrix X is glycidoxypropyl; Q is $NR_x''$ wherein x is 1 and R" is methyl; p is 2; v is 0 and r is 4; T and U are each $NR_x''$ wherein x is 1 in the case of T and x is 2 in the case of U with R being methyl such that all the nitrogens are tertiary.

The process of selectively and quantitatively concentrating and removing Rh, Ir, and/or Ru, present as an anionic complex, present at low concentrations from a plurality of other undesired ions and other chelating agents which may be present at much higher concentrations comprises bringing the multiple ion containing source solution into contact with a polyalkylene-polyamine ligand-containing solid supported compound as shown in Formulas 1–5 which causes the Rh, Ir, and/or Ru species to complex with the polyalkylene-polyamine ligand portion of the compound and subsequently breaking or stripping first the Rh and/or Ru followed by the Ir from the complex with two separate receiving solutions which either change the state to the Rh, Ir, and/or Ru anionic complexes so they do not have affinity for the polyalkylene-polyamine ligand or which forms a stronger complex with the polyalkylene-polyamine ligand than does the anionic Rh, Ir, and/or Ru complex. The two receiving or recovery solutions contain only the Rh and/or Ru or Ir, respectively, in a concentrated form.

The polyalkylene-polyamine ligand solid matrix support functions to attract the desired ions (DI) consisting of Rh, Ir, and/or Ru as an anionic complex according to Formula II.

$$(\text{Matrix-O})_{1-3}\text{-Si-X-L} + \text{DI} \rightarrow (\text{Matrix-O})_{1-3}\text{-Si-X-L} \cdot \text{DI} \quad \text{(Formula II)}$$

Except for DI, Formula II is an abbreviated form of Formula I wherein L stands for the polyalkylene-polyamine containing ligand. DI stands for desired Rh, Ir or Ru ion being removed.

Once the Rh, Ir, and/or Ru are bound to the polyalkylene-polyamine-containing ligand, the Rh and/or Ru anion complex, followed by the Ir anion complex are subsequently separated from the solid materials in a separate receiving liquid by use of a smaller volume of a receiving liquid according to Formula III:

$$(\text{Matrix-O})_{1-3}\text{-Si-X-L:DI} + \text{RL} \rightarrow (\text{Matrix-0})_{1-3}\text{-Si-X-L} + \text{RL:DI} \quad \text{(Formula III)}$$

where RL stands for the receiving liquid.

The preferred embodiment disclosed herein involves carrying out the process by bringing a large volume of the source solution containing multiple ions as defined above, which solution contains hydrogen ions and may also contain other complexing and/or chelating agents, into contact with a polyalkylene-polyamine ligand-solid support compound of Formulas 1-5 in a separation column through which the mixture is first flowed to complex the Rh, Ir, and/or Ru anion complexes with the polyalkylene-polyamine ligand-solid support compound as indicated by Formula II above, followed by the sequential flow through the column of (1) a smaller volume of a first and second receiving liquid as indicated by Formula III above.

Exemplary of receiving liquids, including concentrations and temperatures, which will strip Rh and/or Ru from the ligand, but not affect the Ir complex with the ligand are dilute aqueous HCl (0.1 to 0.2 M) solutions maintained at 90° C. or higher., dilute HCl (0.1 to 0.2 M) solutions containing thiourea (0.1 to 1.0 M) and $TiCl_3$ (0.01 to 1.0 M) maintained at 50° C. or higher; dilute aqueous HCl (0.1 to 0.2 M) solutions containing thiourea (0.1 to 1.0M) and $NaH_2PO_2$ (0.1 to 0.5 M) maintained at 70° C. or higher; aqueous solutions of thiourea (0.1 to 1.0 M) and $H_3PO_2$ (0.1 to 0.5 M) maintained at 70° C. or higher; dilute aqueous HCl (0.1 to 0.2 M) solutions of thiourea (0.1 to 1.0 M) plus $N_2H_5Cl$ (0.1 to 0.5 M) maintained at 90° C. or higher, dilute aqueous HCl (0.1 to 0.2 M) solutions oi thiourea (0.1 to 1.0 M) plus $NaH_2PO_3$ (0.1 to 0.5 M) maintained at 90° C. or higher, aqueous solutions of $FeCl_2$ (0.1 to 0.5 M) plus dilute $HClO_4$ (0.1 to 0.2 M) maintained at 50° C. or higher, aqueous solutions of $Fe(ClO_4)_2$ (0 1 to 0.5 M) plus dilute HCl (0.1 to 0.2 M) maintained at 50° C. or higher, aqueous solutions of $FeCl_2$ (0.1 to 0.5 M) and dilute $HClO_4$ (0.1 to 0.2 M) maintained at 50° C. or higher, aqueous solutions of $Fe(ClO_4)_2$ (0.1 to 0.5 M) and dilute $HClO_4$ (0.1 to 0.2 M) maintained at 50° C. or higher and any others having similar properties which allow for the Rh and/or Ru anion complexes to be stripped from the column without disturbing the Ir bound complex.

Exemplary of a second receiving liquid which will allow for the Ir to be stripped from the solid compound after the Rh and/or Ru anion complexes have been selectively stripped are aqueous solutions of $NH_4Cl$, $(NH_4)_2SO_4$, $NH_4CH_3COO$, $Na_4EDTA$, $Na_3$ citrate, $Na_4P_2O_7$ and some mixtures thereof. In this manner the Rh and/or Ru anion complexes followed by the Ir anion complex are carried out of the column in separate receiving solutions and in a concentrated form. The degree or amount of concentration will obviously depend upon the concentration of the Rh, Ir, and/or Ru in the source solution and the volume of source solution to be treated. The specific receiving liquids being utilized will also be a factor. Generally speaking, the concentration of desired ions in the receiving liquid will be from 20 to 1,000,000 times greater than in the source solution. Other equivalent apparatus may be used instead of a column, e.g. a slurry which is filtered which is then washed with two separate receiving liquids to break the complexes and recover separately Rh and/or Ru followed by Ir. The concentrated ions are then recovered from the receiving phases by known procedures familiar to those skilled in the art.

REMOVAL, CONCENTRATION AND SEPARATION OF Rh, Ir, AND/OR Ru WITH LIGAND-MATRIX COMPOUNDS

The following examples demonstrate how the polyalkylene-polyamine-containing ligand bound to a solid support compound of Formulas 1-5 may be used to remove, concentrate, and separate Rh, Ir, and/or Ru when they are present as certain anionic complexes. In particular the Rh and/or Ru anionic species are also separated from the Ir along with being separated from other metal ions. The polyalkylene-polyamine ligand is placed in a column. An aqueous source solution containing certain anionic complexes of Rh, Ir, and/or Ru, in a mixture of other metal ions and/or chelating agents which may be present in a much greater concentration, is passed through the column. The flow rate for the solution may be increased by applying pressure with a pump on the top or bottom of the column or applying a vacuum in the receiving vessel. After the source solution has passed through the column, a much smaller volume of two different recovery solutions (receiving liquids), i.e., aqueous solutions which either change the state of the bound anionic species so they do not have affinity for the polyalkylene-polyamine ligand or form a stronger complex with the polyalkylene-polyamine ligand than do the anionic species of interest, are flowed through the column. The first recovery solution (receiving liquid) strips and collects only the Rh and/or Ru while the second recovery solution (receiving liquid) strips and collects only the Ir. The Rh, Ir, and/or Ru are now present in concentrated form for subsequent recovery. Suitable receiving solutions for the Rh and/or Ru collection are as stated above as are suitable receiving solutions for the Ir collection. The preceding listings are exemplary and other receiving solutions may also be utilized. The only limitation on the first receiving solution being its ability to function to remove the Rh and/or Ru from the polyalkylene-polyamine-containing ligand by rapidly changing the state of the complex Rh and/or Ru species so they do not have affinity for the ligand without doing the same to Ir. Similarly, the only limitation on the second receiving solution is its ability to function to remove the Ir from the polyalkylene-polyamine-containing ligand. Obviously, the first receiving solution is the more critical of the two in that it must be selective for breaking the Rh and/or Ru anionic complexes from the ligand without disturbing the complex formed between the Ir anionic complex and the ligand. The second receiving solution does not have to be specific or selective to only the Ir anionic complex. Any solution that can break the Ir anionic complex from the ligand is suitable.

The following examples of separations and recoveries of ions utilize the inorganic support bound polyalkylene-polyamine-containing ligands which were made as described in Examples 1 through 6. These examples are illustrative only and are not comprehensive of the many separations of ions that are possible using the compositions of Formulas 1-5.

EXAMPLE 7

In this example, 5 g of the matrix supported branched polyalkylene polyamine of Example 3 was placed in a column 5.1 cm long having a diameter of 0.9 cm. A 75 ml "source" solution of approximately 100 ppm (parts per million) Rh(III), 100 ppm Ru(III). 100 ppm Ir(III), 1000 ppm pt(IV), 1000 ppm Pd(IV), 10,000 ppm Cu(II), 20,000 ppm Fe(III), and 9 M HCl was drawn through the column using a vacuum pump. The column was then washed with 50 mL of 0 1 M HCl. A 25 mL aqueous recovery solution of 90+° C. 0.1 M HCl followed by a 25 mL aqueous recovery solution of 25° C. 5 M NH$_4$Cl were then passed through the column. Analysis of the 0.1 M HCl recovery solution by inductively coupled plasma spectroscopy (ICP) showed that at least 98% of the Rh(III) and Ru(III) originally in the 75 mL "source" solution described above was in the 25 mL recovery solution and that no Pt, Pd, Fe, Cu, or Ir impurity could be detected in the recovery solution. Furthermore, analysis of the NH(Cl recovery solution showed that greater than 99% of the Ir(III) originally in the 75 mL "source" solution described above was in the 25 mL recovery solution and that no Pt, Pd, Fe, Cu, Rh, or Ru could be detected in this recovery solution.

EXAMPLE 8

The procedure of Example 7 was repeated using 5 g of the matrix supported polyalkylene-polyamine of Example 5. Virtually identical results were obtained.

EXAMPLE 9

In this example, 5 g of the matrix supported branched polyalkylene-polyamine of Example 2 was placed in a column 5.1 cm long having a diameter of 0.9 cm. A 75 mL "source" solution of approximately 100 ppm Rh(III), 100 ppm Ru(III), 100 ppm Ir(III), 50,000 ppm Cu(II), and 9 M HCl was drawn through the column using a vacuum pump. The column was then washed with 50 mL of 0.1 M HCl. A 10 mL aqueous recovery solution of 70° C. 1 M thiourea plus 0.02 M TiCl$_3$ plus 0.1 M HCl followed by a 25 mL aqueous recovery solution of 4 M (NH$_4$)$_2$SO$_4$ were then passed through the column. Analysis of the thiourea recovery solution by ICP showed that greater than 99% of the Rh and Ru originally in the 75 mL "source" solution described above was in the 10 mL recovery solution and that no Ir or Cu impurity could be detected in the recovery solution. Furthermore, analysis of the (NH$_4$)$_2$SO$_4$ recovery solution showed that greater than 99% of the Ir(III) originally in the 75 mL "source" solution described above was in the 25 mL recovery solution and that no Rh, Ru, or Cu impurity 19 could be detected in this recovery solution.

EXAMPLE 10

The procedure of Example 9 was repeated using 5 g of the matrix supported polyalkylene-polyamine of Example 1. Virtually identical results were obtained.

EXAMPLE 11

The procedure of Example 9 was repeated using 5 g of the matrix supported macrocyclic polyalkylene-polyamine of Example 4 with 70° C 1 M Thiourea plus 0.1 M Hypophosphorous acid used in place of the Thiourea plus TiCl$_3$ receiving solution. Virtually identical results were obtained.

EXAMPLE 12

The procedure of Example 9 was repeated using 5 g of the matrix supported polyalkylene-polyamine of Example 6 with 70° C. 1 M Thiourea plus 0.1 M NaH$_2$PO$_2$ plus 0.1 M HCl in place of the Thiourea plus TiCl$_3$ receiving solution. Virtually identical results were obtained.

The experiment in Example 7 was also carried out using the analogous, but unbranched ligand bonded silica gels of Examples 1, 4, and 6. No Ir was detected in a first receiving solution of hot, dilute HCl designed for selective Rh removal. However, only a portion of the Rh could be eluted since Rh metal and/or kinetically nonlabile Rh$^{3+}$ complexes with the ligand bonded silica gels occurred with the materials of Examples 1, 4 and 6. Furthermore, the capacity of the ligand to bind the Rh and Ir anionic species using the branched amines of Formula 4 as exemplified in Examples 2 and 3 far exceeds that of the quaternary ligands of Formula 5 as exemplified in Example 5. From these additional experiments, it will be appreciated that the polyalkylene-polyamine ligands of Formula 4 bonded to a solid support such as silica gel of the present invention provide materials particularly useful for the separation of Rh from Ir using a very simple and inexpensive first receiving solution for selectively collecting the Rh. The Rh, Ir, and/or Ru can then be recovered from the concentrated recovery solution by standard techniques known in the science of these materials.

Although the invention has been described and illustrated by reference to certain specific silica gel-bound polyalkylene-polyamine ligands of Formulas 1-5 and the process of using them, other analogs of these polyalkylene-polyamine ligands falling within the scope of Formulas 1-5 are also within the scope of the compounds and processes of the invention as defined in the following claims.

We claim:

1. A method for the concentration, removal and separation of Rh, Ir, and/or Ru present as particular anionic complexes from a source solution which comprises,
   (a) bringing said source solution having a first volume into contact with a compound comprising a branched or unbranched, macrocyclic or nonmaorocyclic polyalkylene-polyamine-containing ligand covalently bonded to a solid inorganic support matrix represented by the formula:

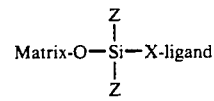

where X is a spacer grouping having from 4 to 20 carbon atoms which is of a functional nature that it is sufficiently hydrophilic to function in an aqueous environment and will separate the ligand portion from the solid matrix support to maximize the interaction between the ligand and anionic complexes being separated; ligand is a member selected from the group consisting of highly stable macrocyclic, nonmacrocyclic, branched or unbranched polyalkylene-polyamine-containing hydrocarbon which is covalently bonded to X; Matrix is a solid support material selected from the group consisting of sand, silica gel, glass, glass fibers, alumina, nickel oxide, zirconia, or titania, or other hydrophilic inorganic supports and mixtures thereof and Z is a member selected from the group consisting of Cl, Br, I, alkyl, alkoxy, substituted alkyl or substituted alkoxy and 0-matrix; said ligand portion of said compound having an affinity for said Rh. Ir, and/or Ru anionic complexes to form a complex between the Rh, Ir, and/or Ru anion complexes and said polyalkylene-polyamine containing ligand portion of said compound; (b) removing source solution from contact with said compound to which said Rh, Ir, and/or Ru anionic complexes have been complexed; (c) contacting said compound having said Rh, Ir, and/or Ru anionic complexes complexed thereto with a smaller volume of a first receiving solution which changes the state of the Rh and/or Ru anionic complexes so they do not have affinity for the ligand without breaking the complex between the Ir anionic complex and said compound thereby selectively breaking the complex between said compound and said Rh and/or Ru anionic complex and recovering the Rh and/or Ru anionic complex in concentrated form in said smaller volume of said receiving solution; and (d) contacting said compound having said Ir anionic complex complexed thereto with a smaller volume of a second receiving solution having either a greater affinity for said Ir anionic complex than said compound or a greater affinity for said compound than said Ir anionic complex thereby breaking said complex between said compound and said Ir anionic complex and recovering the Ir anionic complex in concentrated form in said smaller volume of said second receiving solution.

2. A method according to claim 1 wherein ligand is a member selected from the group consisting of

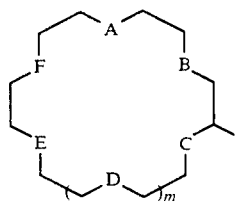
(a)

where A, B, C, D, E and F may be any combination of O, $OCH_2$, N—R or $N(R)CH_2$, where R is a member selected from the group consisting of H, alkyl of 1 to 10 carbon atoms or benzyl; m is an integer between $-1$ and 4 with the proviso that at least two amine nitrogens must be present in A, B, C, D, E and F.

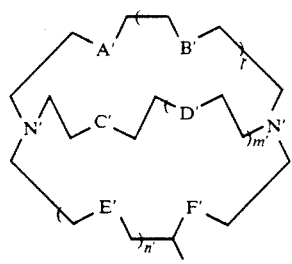
(b)

where A', B', C', D', E' and F' may be any combination of O, $OCH_2$, N-R or $N(R)CH_2$, where R is a member selected from the group consisting of H, alkyl of 1 to 10 carbon atoms or benzyl; l', m' and n' can each be an integer between 0 and 2;

(c)

where J and K are each a radical selected from the group consisting of $N(R^3)$, $N(R^3)CH_2$, O and $OCH_2$, with the proviso that either J or K must be $N(R^3)$ or $N(R^3)CH_2$; $R^2$ is a radical selected from the group consisting of H or lower alkyl; $R^3$ is a radical selected from the group consisting of H, lower alkyl and aryl such as phenyl, naphthyl and pyridyl; c is an integer of from 1 to about 25; d is an integer of from 0 to about 25; M is a radical selected from the group consisting of H, $NH(R^3)$, OH, lower alkyl;

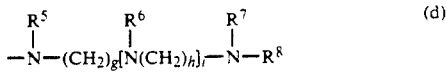
(d)

wherein $R^5$ and $R^6$ are $(CH_2)_jNR^7R^8$ or H; $R^7$ and $R^8$ are $(CH_2)_kNH_2$ or H; g, h, j and k are each an integer of from 2 to 10; i is an integer of from 0 to 10; and

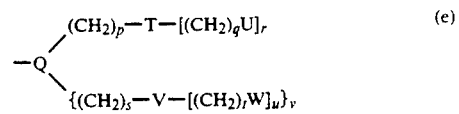
(e)

wherein Q is a member selected from the group consisting of N, $NR_1''$ and O; T, U, V, and W are members selected from the group consisting of $NR_x''$, and 0, or OH if 0 is located in a terminal position, with x being a positive integer such that the amine nitrogens present are tertiary or quaternary with the further proviso that the formula contains at least two tertiary or quaternary nitrogens from among Q, T, U, V, and W; p, q, s, and t represent integers ranging from 2 to 10; r and u are each integers ranging from 0 to 25 and v is an integer of 0 or 1 with the proviso that v must be 0 when Q is $NR_x''$ or O; R'' is a member selected from the group consisting of lower alkyl and substituted lower alkyl; and X is a member selected from the group consisting of aryl, glycidyl, glycidoxyalkyl, alkoxyalkyl and carboxyalkyl and combinations thereof.

3. A method according to claim 2 wherein said compound is contained in a packed column and wherein source solution is first flowed through said packed column to allow the formation of a complex between said Rh, Ir, and/or Ru anionic complexes and said compound followed by the breaking of said Rh and/or Ru anionic complex from said compound and removal of Rh and/or Ru anionic complex from said packed column and the subsequent breaking of said Ir anionic complex from said compound and removal of Ir anionic complex by flowing said volumes of said first and second receiving solutions through said packed column and separately recovering said first and second receiving solutions said first receiving solution containing Rh and/or Ru anionic complexes in concentrated from and said second receiving solution containing said Ir anionic complexes in concentrated form.

4. A method according to claim 3 wherein said first receiving solution is any solution having properties which allow for the Rh and/or Ru anion complexes to be broken from said compound in said column without disturbing the Ir bound complex.

5. A method according to claim 4 wherein said first receiving solution is selected from the group consisting of dilute aqueous HCl (0.1 to 0 2 M) solutions maintained at 90° C. or higher., dilute HCl (0.1 to 0.2 M) solutions containing thiourea (0.1 to 1.0 M) and $TiCl_3$ (0.01 to 1.0 M) maintained at 50° C. or higher., dilute aqueous HCl (0.1 to 0.2 M) solutions containing thiourea (0.1 to 1.0M) and $NaH_2PO_2$ (0.1 to 0.5 M) maintained at 70° C. or higher; aqueous solutions of thiourea (0.1 to 1.0 M) and $H_3PO_2$ (0 1 to 0.5 M) maintained at 70° C. or higher; dilute aqueous HCl (0.1 to 0.2 M) solutions of thiourea (0.1 to 1.0 M) and N$_2$H$_5$Cl (0.1 to 0.5 M) maintained at 90° C. or higher, dilute aqueous HCl (0.1 to 0.2 M) solutions of thiourea (0.1 to 1.0 M) plus NaH$_2$PO$_3$ (0.1 to 0.5 M) maintained at 90° C. or higher, aqueous solutions of FeCl$_2$ (0.1 to 0.5 M) plus dilute HClO$_4$ (0.1 to 0.2 M) maintained at 50° C. or higher, aqueous solutions of Fe(ClO$_4$)$_2$ (0.1 to 0.5 M) plus dilute HCl (0.1 to 0.2 M) maintained at 50° C. or higher, aqueous solutions of FeCl$_2$ (0.1 to 0.5 M) and dilute HClO$_4$ (0.1 to 0.2 M) maintained at 50° C. or higher, aqueous solutions of Fe(ClO$_4$)$_2$ (0.1 to 0.5 M) and dilute HClO$_4$ (0.1 to 0.2 M) maintained at 50° C. or higher.

6. A method according to claim 5 wherein said second receiving solution is any solution having properties which allow for the Ir anion complexes to be broken from said compound in said column.

7. A method according to claim 6 wherein said second receiving solution is selected from the group consisting of aqueous solutions of NH$_4$Cl, (NH$_4$)$_2$SO$_4$, NH$_4$CH$_3$COO, Na$_4$EDTA, Na$_3$ citrate, Na$_4$P$_2$O$_7$ and mixtures thereof.

8. A method according to claim 5 wherein ligand has the formula

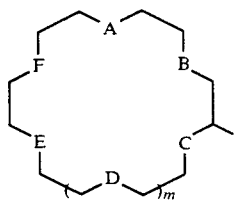

where A, B, C, D. E and F may be any combination of O, OCH$_2$, N-R or N(R)CH$_2$, where R is a member selected from the group consisting of H, alkyl of 1 to 10 carbon atoms or benzyl; m is an integer between -1 and 4 with the proviso that at least two amine nitrogens must be present in A, B, C, D, E and F.

9. A method according to claim 5 wherein ligand has the formula:

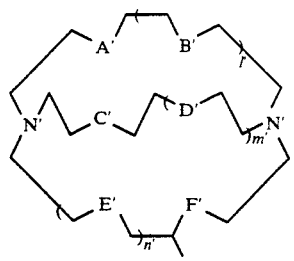

where A', B', C', D', E' and F' may be any combination of O, OCH$_2$, N-R or N(R)CH$_2$, where R is a member of selected from the group consisting of H, alkyl of 1 to 6 carbon atoms or benzyl; l', m' and n' can each be an integer between 0 and 2.

10. A method according to claim 5 wherein ligand has the formula:

where J and K are each a radical selected from the group of N(R$^3$), N(R$^3$)CH$_2$, O and OCH$_2$, with the proviso that either J or K must be N(R$^3$) or N(R$^3$)CH$_2$; R$^2$ is a radical selected from the group consisting of H or lower alkyl; R$^3$ is a radical selected from the group consisting of H, lower alkyl and aryl; c is an integer of from 1 to about 25; d is an integer of from 0 to about 25; M is a radical selected from the group consisting of H, NH(R$^3$), OH and lower alkyl:

11. A method according to Claim; 10 wherein X has the formula:

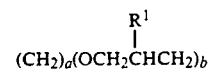

wherein R$^1$ is a radical selected from the group consisting H, OH, lower alkyl and aryl, a is an integer of from 2 to about 10 and b is 1.

12. A method according to claim 11 wherein R$^1$ is OH and a is 3.

13. A method according to claim 5 wherein ligand has the formula:

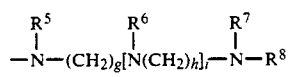

wherein R$^5$ and R$^6$ are (CH$_2$)$_j$NR$^7$R$^8$ or H; R$^7$ and R$^8$ are (CH$_2$)$_k$NH$_2$ or H; g, h, j and k are each an integer of from 2 to 10 and i is an integer of from 0 to 10.

14. A method according to claim 11 wherein X has the formula:

wherein R$^4$ is a radical selected from the group consisting H, OH, lower alkyl and aryl, e is an integer of from 2 to about 10 and f is 1.

15. A method according to claim 14 wherein R$^4$ is OH and e is 3.

16. A method according to claim 5 wherein ligand has the formula:

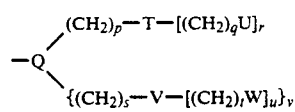

wherein Q is a member selected from the group consisting of N, NR$_x$'' and 0; T, U, V, and W are members selected from the group consisting of NR$_x$'', and 0, or OH if 0 is located in a terminal position, with x being a positive integer such that the amine nitrogens present are tertiary or quaternary with the further proviso that the formula contains at least two tertiary or quaternary nitrogens from among Q, T, U, V, and W; p, q, s, and t represent integers ranging from 2 to 10; r and u are each integers ranging from 0 to 25 and v is an integer of 0 or 1 with the proviso that v must be 0 when A is NR$_x$'' or 0 and R'' is a member selected from the group consisting of lower alkyl and substituted lower alkyl.

17. A compound of the formula:

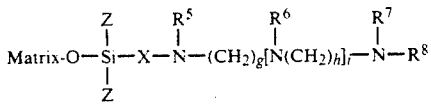

wherein X is a spacer grouping having from 2 to 20 carbon atoms and selected from the group consisting of aryl, glycidyl. glyoidoxyalkyl, alkoxyalkyl and carboxyalkyl and combinations thereof; Matrix is a solid support material selected from the group consisting of sand, silica gel, glass, glass fibers, alumina, nickel oxide, zirconia, or titania, or other hydrophilic inorganic supports and mixtures thereof; Z is a member selected from the group consisting of Cl, Br, I, alkyl, alkoxy, substituted alkyl or substituted alkoxy and 0-matrix; $R^5$ and $R^6$ are $(CH_2)_jNR^7R^8$ or H; $R^7$ and $R^8$ are $(CH_2)_kNH_2$ or H; g, h, j and k are each an integer of from 2 to 10; and, i is an integer of from 0 to 10.

18. A compound according to claim 17 wherein X has the formula:

wherein $R^4$ is a radical selected from the group consisting H, OH. lower alkyl and aryl; e is an integer of from 1 to 10; f is an integer of 1.

19. A compound according to claim 18 wherein R is OH and e is 3.

20. A compound according to claim 19 wherein g is 2, h is 2, i is 2, $R^5$ is H, $R^6$ is $(CH_2)_jNR^7R^8$ both first and second occurrence with j being 2, $R^7$ and $R^8$ are H in the first occurrence and are $(CH)_kNH_2$ in the second and third occurrence, with k being 2; and wherein Z is O-Matrix with Matrix being silica and having the formula:

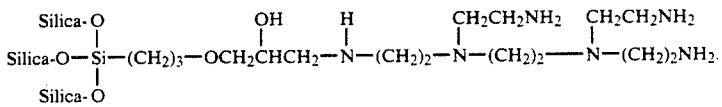

21. A compound according to claim 19 wherein g is 2, i is 0, $R^5$ is H, $R^7$ and $R^8$ are $(CH)_kNH_2$, with k being 2; and wherein Z is O-Matrix with Matrix being silica and having the formula:

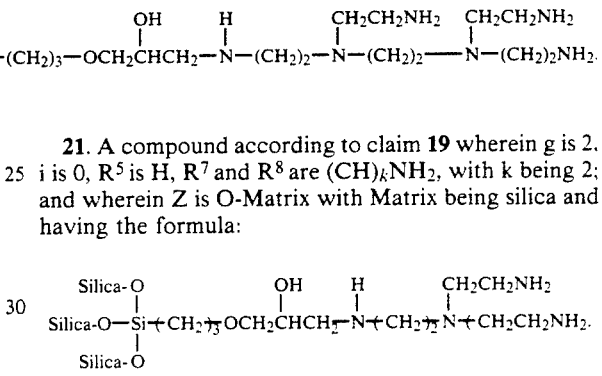

* * * * *